Sept. 21, 1965    H. GEISTHOFF    3,207,834
METHOD OF BENDING UNFILLED PIPES AND TUBES
Filed Oct. 16, 1962    3 Sheets-Sheet 1

INVENTOR.
Hubert Geisthoff
BY
Mestern, Ross & Mestern 3,207,834
METHOD OF BENDING UNFILLED PIPES AND TUBES
Hubert Geisthoff, Donrath, Siegkreis im Wiesengrund, Germany, assignor to Jean Walterscheid KG., Lohmar, Siegburg, Germany
Filed Oct. 16, 1962, Ser. No. 232,334
Claims priority, application Germany, Oct. 17, 1961, W 30,897
4 Claims. (Cl. 264—339)

The invention relates to a method of bending unfilled pipes, and particularly to pipes made of plastics, while avoiding puckering of the pipe wall.

When a pipe is bent to a fairly small radius, it will generally pucker when the stress in the wall on the inside of the bend, which undergoes severe compression in course of bending, reaches a certain level. When plastics tubing is bent, this puckering process becomes particularly noticeable if the wall thickness is small. To prevent such puckering, it is usual to fill the pipes with some material of minimum compressibility, so that the force causing the pucker is opposed by adequate counteracting forces. Experiments have shown that filling a pipe in this way with sand, water or spiral-shaped objects is also successful in the bending of plastic pipes. It is far too troublesome, however, to resort to the pipe-filling method in production lines, where large numbers of such pipes are to be bent. Nevertheless, whether or not plastic pipes, which in themselves have many advantages, can be used for the very wide range of technical purposes for which they are suitable depends in part on the successful production of permanent pipe bends by a simple and inexpensive process. Attempts have been made to heat pipes to various temperatures and then to shape them with tools of the usual kind, but these experiments were only partially successful, quite apart from the fact that heating the pipe is in itself a troublesome process, to be avoided if possible.

The problem which the invention sets out to solve is thus to do away with the pipe-filling method used hitherto and with any heating process, yet to bend pipes without any risk of puckering, so that the bending process may be adapted to mass production.

The process covered by the invention consists in subjecting the pipe, before or in the course of bending, to deformation transverse to a plane through the longitudinal axis of the bent pipe. The process is particularly successful with pipes of plastic material, but is has been found that pipes of any other material can be just as effectively bent by the same process, the only difference being in the shaping forces to be applied. There is particular advantage in carrying out transverse deformation of the pipe, in accordance with the invention, by applying pressure to the outer wall of the pipe. In this way, one deliberately increases the major axis, which in itself is contrary to nature, because the internal stability of the pipe is thereby increased.

The method of the invention recognises that transverse deformation of an unfilled pipe causes the zones of pressure and flexion to undergo considerable molecular stress. The molecular heating of these zones which takes place in the process is clearly the explanation for it being possible to shape pipes without additional aid, while preventing the pipes from puckering. It is a remarkable fact that the same beneficial effect is not found when the pipe is heated, because the heating action extends over the entire wall of the pipe, so that the strength relationships between bending and pressure zones on the one hand and the remaining wall areas on the other remain approximately the same as with an unheated pipe. The only way to obtain some degree of improvement is to confine the heating to the pressure and flexion zones, for example, by inducing friction effects at these positions. It will be readily apparent, however, that the use of transverse deformation to supplement the bending action is a far simpler and easier method, which moreover enables better results to be obtained.

With the method according to the invention, it is found to be advantageous to repeat the transverse deformation while bending is in process; for example, by subjecting the pipe to oscillatory stresses, i.e., to periodic elastic transverse deformation, during the permanent or plastic deformation, during the permanent or plastic deformation in the axial plane. In this way, one is able to increase or reduce the treatment given to the pressure zone of the pipe that has to be bent, thus making it possible to bend pipes of different diameters and different wall thicknesses under the conditions best suited to each. For this purpose, both the amplitude and periodicity of oscillation can be made variable within wide limits. In this connection, "oscillation" includes, for the purposes of the invention, a slow oscillatory movement.

Another attractive feature of the invention lies in continuing the transverse deformation only until the final angle of bend has been partially achieved, the pipe being subsequently subjected to further bending without filling or transverse deformation. Where this has been done, it has been found that there is still no risk of puckering after the transverse deformation of the pipe that is to be bent has been stopped. Experiments have shown, for example, that only half the desired angle needs to be bent with the assistance of transverse deformation; if the partly bent pipe be removed from the bending device, it can be further bent by hand without risk of puckering. This surprising discovery, and its effect, can also be turned to account in speeding up the mass production of bent pipes and making it possible to complete the bending of pipes at the assembly position.

Suitable means for carrying out the process, consisting of a cylindrical body, round the curved face of which the pipe is bent, is characterised by the provision of two containing walls at right angles to the longitudinal axis of the cylindrical body, the distance between these walls being less than the width of the pipe that is to be bent between them. It is the size of this gap which in itself, during the bending process, ensures that the pipe to be bent must necessarily undergo deformation transverse to the plane of bending. If the containing walls are fixed rigidly in relation to each other, it is advisable for their edges to be turned or bent outwards from each other, to enable the pipe to be forced between them in the first place. It is better, however, to arrange for the distance between the two containing walls to be adjustable; here again, the edges of the containing walls can still be turned or bent outwards.

One advantageous version of the invention consists in at least one of the two containing walls being constructed so as to be capable of movement to and fro in the direction of the longitudinal axis of the cylindrical body. With one wall movable in this way, the pipe placed in position can be subjected to deformation by pressure exerted by this wall. In another typical version, the movable containing wall is connected to a source of oscillatory motion, for example, a cam disc, an eccentric, a periodic magnet and so forth, so that in this version periodic forces of deformation can be exerted on the pipe.

Finally, it is also possible to provide the containing walls in a helix around the cylindrical body, so that pipes can be bent through angles of up to 360° or even wound helically, without the risk of puckering at any position. Whether the helical containing walls are to rotate or to remain stationary in course of pipe bending is left to the specialist to decide. All that needs to be established is that both these methods of pipe bending are possible.

These and other features of the invention are illustrated, diagrammatically and by way of example only, in the accompanying drawings, in which.

Figure 1:
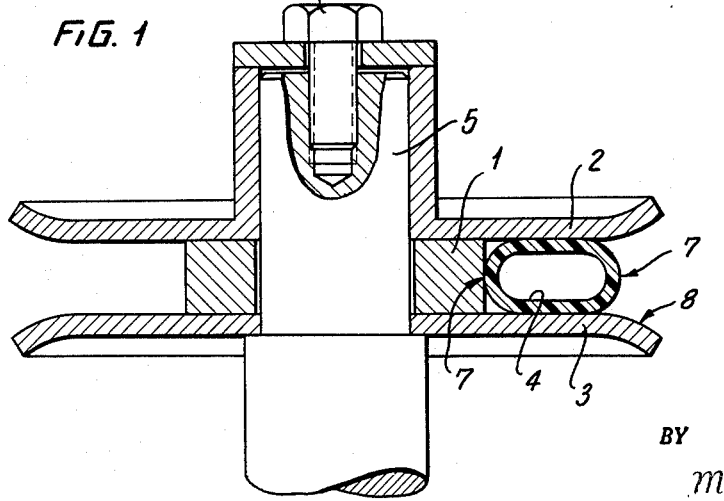
FIGURE 1 is a diagrammatic longitudinal section through a pipe bending means.

In the construction shown by way of example in FIGURE 1, 1 represents a cylindrical body, round which pipe 4, which in its original condition is assumed to have a cylindrical cross-section, is to be bent. This cylindrical body 1 is disposed between two containing surfaces, 2 and 3. In the example illustrated, these are in the form of discs, but in principle they may be of any desired shape. All the parts 1 to 3 are disposed on a spindle or shaft 5, and clamped together by a bolt 6. The gap between the discs 2 and 3 is less than the original width of the pipe 4. In the present example the pipe 4 has been compressed by the containing wall 2, moving under the control of bolt 6 transversely to the plane through the longitudinal axis of the bent pipe. During this deformation, those parts of the pipe numbered 7 are placed under the greatest stress.

If now, in the position shown in FIGURE 1, the pipe be bent, after transverse deformation, round cylindrical body 1, it will be found, surprisingly enough, that the puckering of the pipe which otherwise usually occurs at the face under compressive stress does not take place. This surprising effect appears to be due to sudden molecular heating in zones 7, caused by the transverse deformation, which in turn prevents the usual puckering from occurring.

It is not essential that containing disc 2 should be movable. All that is necessary is for containing walls 2 and 3 to be provided at a constant distance apart; but the pipe 4 has then to be forced into this gap, so as to produce the necessary deformation. To facilitate this operation, edges 8 of containing walls 2 and 3 may be bevelled, bent or turned. This turned lip 8 also makes it easier to carry the pipe round the cylindrical body 1.

It is simpler however, to produce the pipe deformation with the aid of bolt 6, containing wall 2 first being moved far enough back to enable the as yet unaltered pipe 4 to be inserted effortlessly into the space between containing walls 2 and 3. The deformation of pipe 4 can then be readily brought about by tightening the bolt 6. In this connection the bolt 6 may be regarded as representing any kind of force that is sufficient to produce deformation of pipe 4 transversely to the bending plane.

Again, in the construction shown by way of example in FIGURE 1, it has been assumed that the pipe is made of plastics and that the bend is to be permanent. It will be readily appreciated, though (and this has already been found in practice), that the same bending process can also be applied to a pipe of other material, for example, metal. In any case, the risk of puckering is removed. At the same time, the shaping forces applied will need to be greater or less, according to the elasticity and strength of the material of which the pipe is made. The specialist worker will be able to determine empirically the correct force to apply in the circumstances.

Figure 2:
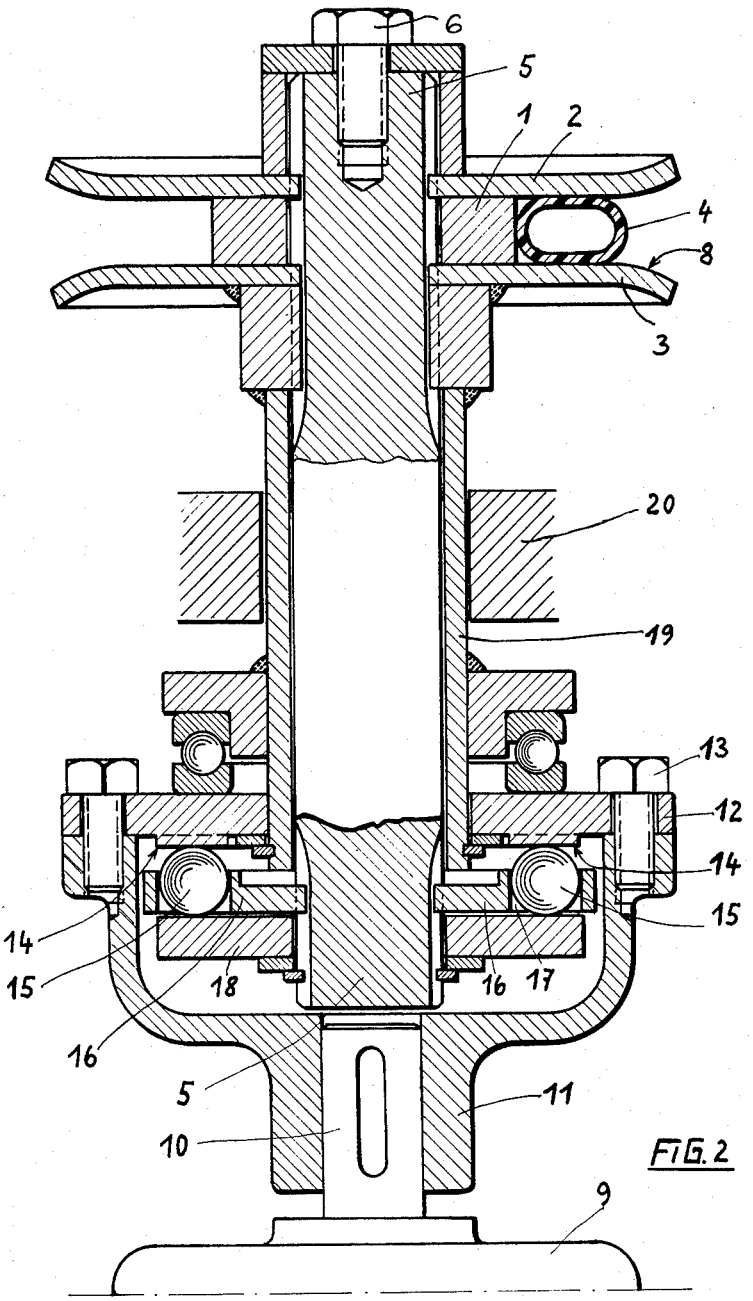
FIGURE 2 is a longitudinal section through a pipe bending means with cam-disc drive.

In the construction shown by way of example in FIGURE 2, it has been assumed that during the bending process pipe 4 is to undergo repeated deformation transversely to the bending plane. For this purpose, a motor 9, is provided in this construction, on the spindle end of which 10, is mounted a hollow hub 11, carrying a cam disc 12, rigidly held in place by bolts 13. The cam track 14, is mounted on the inner face of cam disc 12. When spindle 10 turns, the cam track 14 of cam disc 12 forces balls 15 in the direction of the motor.

The balls are caged so as to be free to rotate in holes, 17, drilled in disc 16. The disc 16 is rigidly secured (by splining, for example) to shaft or spindle 5, to prevent rotary and axial motion. The axial position of the disc 16 is determined by backing-disc 18. The depression of balls 15 thus produces axial displacement of spindle 5 to which containing wall 2 is secured by means of bolt 6. The movement of containing wall 2 in the direction of motor 9 brings about the transverse deformation of pipe 4. The inherent elasticity of pipe 4 is then utilised to restore containing wall 2, along with spindle 5, as soon as cam track 14 provides a free path for such movement. Pipe 4 thus functions as a spring. According to how fast shaft 10 is turning and how many cams there are in cam track 14, the more (or less) frequent per unit time will be the number of transverse deformation actions on pipe 4. The example in FIGURE 2 represents a case in which the amplitudes and periodicities of oscillation are in the medium range. This bending device, furthermore, can be held by a bushing 19, in a vise 20, or in some other form of clamp. The important thing is that the normal process of bending the pipe shall take place as far as possible during the axial movement of containing wall 2.

If it is desired to use a smaller amplitude and a correspondingly higher periodicity for the transverse deformation of pipe 4, it may be advisable to employ a periodic magnet or similar vibrator to provide the motion for containing wall 2.

Figure 3:
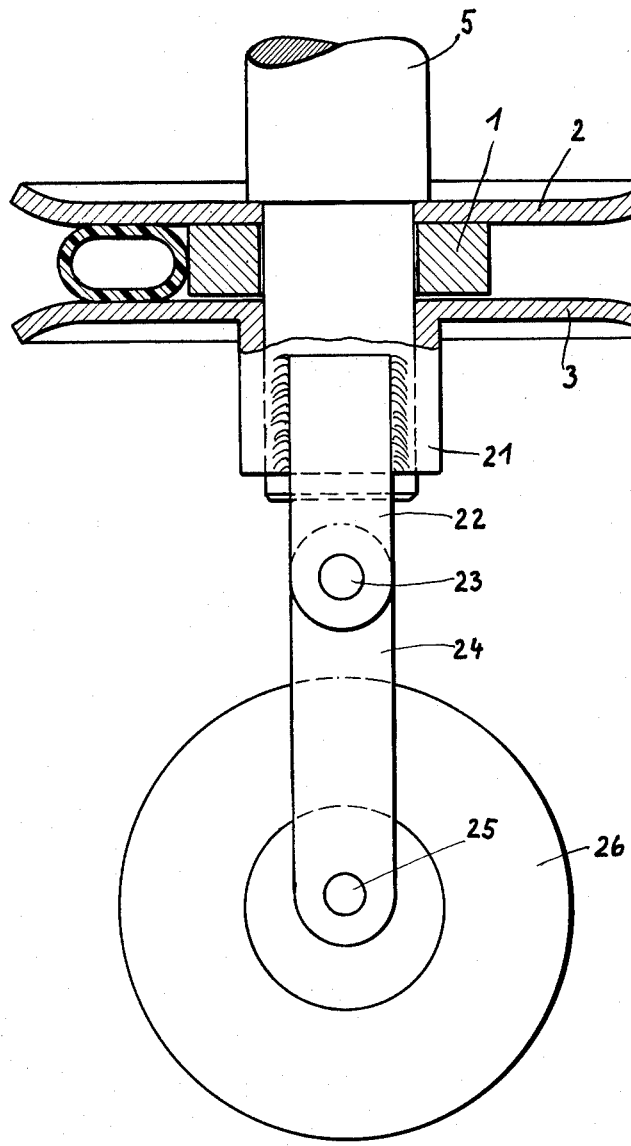
FIGURE 3 is a longitudinal section through a pipe bending means with eccentric drive.

FIGURE 3 represents a case in which greater amplitudes and lower periodicities are concerned. Here an eccentric 25/26, acting through connecting rod 24 and rigid link 22, serves to provide the motion for containing wall 3. Link 22, which with connecting rod 24 forms joint 23, is secured to hub 21 of retaining wall 3. In this case shaft 5 is held stationary to act as a spindle.

This construction can be used to produce the deformation of pipe 4 in a single operation, by putting the eccentric motion out of action, for example, as soon as the eccentric lies in the position illustrated; or this means may also be employed to carry out a series of transverse deformations on the pipe.

Figure 4:
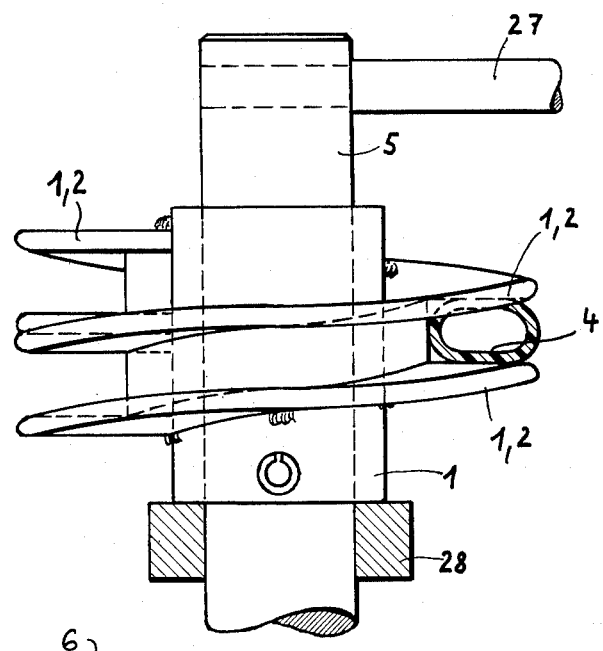
FIGURE 4 is a longitudinal section through a pipe bending means with helical containing walls.

Finally, the construction shown by way of example in FIGURE 4 is intended to demonstrate how pipes can also be bent through large angles, without fear of their puckering in the zones of compression. In this case, the containing walls 1/2 provided, are of helical design and are secured rigidly to cylindrical body 1. Spindle 5, for example, may have a lever 27 connected transversely to it, the means as a whole being provided to turn in bearing 28. By the use of some form of travel limiting device (not shown) for pipe 4, rotation of spindle 5 can be caused to bring about simultaneously both the bending and transverse deformation of the pipe.

Here, the transverse deformation is produced by virtue of the fact that as the pipe is forced towards the cylindrical body 1, it is bound to undergo deformation, because the space between containing walls 1/2 is again less than the width of the original pipe. In this way, it is also possible to produce helical bends, but it must be borne in mind that the pipe once bent has a certain power of recovery and will try to return to its former shape. Thus the bent pipe springs open again to some extent, so that the final radius of curvature of the bend will in any case always be greater than the radius of the cylindrical body 1. Surprisingly however, it has been found that a pipe, once it has been bent in the manner described in the invention, will submit to further bending without any need for transverse deformation. Strange as it may be, there is no puckering during such further bending. One may therefore carry out a partial bend in course of production and leave its completion until the assembly stage. This offers particular advantages, especially where pipes made of plastics material are being used.

The constructions illustrated by way of example make it clear that numerous ways can be found of putting into effect the principles underlying the invention. The invention is therefore not confined to the examples described, which serve in the main merely as a means of clearly demonstrating the process covered by the invention.

I claim:

1. A method of bending a resiliently deformable pipe having a longitudinal axis, comprising the steps of temporarily and elastically deforming said pipe radially outwardly at diametrically opposite locations substantially in an axial plane of said pipe, while simultaneously bending said pipe in said plane about an arcuate surface beyond the elastic limit to permanently deform said pipe.

2. A method as defined in claim 1, wherein said pipe is subjected to compression in a plane transversely of said axis and perpendicular to said axial plane.

3. A method as defined in claim 2, wherein said pipe is subjected to said compression intermittently at predetermined intervals of time while being continuously bent about said arcuate surface.

4. A method as defined in claim 2, wherein said compression is terminated prior to completion of the bending of said pipe about said surface.

References Cited by the Examiner

UNITED STATES PATENTS

| | | | |
|---|---|---|---|
| 220,536 | 10/79 | Hyde | 264—339 |
| 1,772,899 | 8/30 | Johnson | 153—32 |
| 1,877,628 | 9/32 | Replogle | 18—56 |
| 2,366,141 | 12/44 | Alderfer. | |
| 2,389,038 | 11/45 | German | 18—56 |
| 2,630,033 | 3/53 | Stover | 153—32 XR |
| 2,897,545 | 8/59 | Meissner | 18—19 |
| 2,999,272 | 9/61 | Warnken | 18—19 |

ROBERT F. WHITE, *Primary Examiner.*

ALEXANDER H. BRODMERKEL, *Examiner.*